United States Patent
Shellef et al.

(10) Patent No.: US 10,446,138 B2
(45) Date of Patent: Oct. 15, 2019

(54) SYSTEM AND METHOD FOR ASSESSING AUDIO FILES FOR TRANSCRIPTION SERVICES

(71) Applicant: Verbit Software Ltd., Ramat Gan (IL)

(72) Inventors: Eric Shellef, Givaatayim (IL); Kobi Ben Tzvi, Ramat Hasharon (IL); Tom Livne, Ramat Gan (IL)

(73) Assignee: Verbit Software Ltd., Tel Aviv (IL)

( * ) Notice: Subject to any disclaimer, the term of this patent is extended or adjusted under 35 U.S.C. 154(b) by 74 days.

(21) Appl. No.: 15/791,953

(22) Filed: Oct. 24, 2017

(65) Prior Publication Data

US 2018/0342240 A1  Nov. 29, 2018

Related U.S. Application Data

(60) Provisional application No. 62/509,853, filed on May 23, 2017.

(51) Int. Cl.
| | |
|---|---|
| *G10L 17/00* | (2013.01) |
| *G10L 17/26* | (2013.01) |
| *G10L 15/18* | (2013.01) |
| *G10L 15/16* | (2006.01) |
| *G10L 25/84* | (2013.01) |
| *G06N 3/08* | (2006.01) |
| *G10L 21/0272* | (2013.01) |
| *G06Q 30/06* | (2012.01) |
| *G10L 15/00* | (2013.01) |
| *G10L 25/51* | (2013.01) |
| *G10L 25/60* | (2013.01) |

(Continued)

(52) U.S. Cl.
CPC ............ *G10L 15/1815* (2013.01); *G06N 3/08* (2013.01); *G06Q 30/0611* (2013.01); *G10L 15/005* (2013.01); *G10L 15/16* (2013.01); *G10L 21/0272* (2013.01); *G10L 25/51* (2013.01); *G10L 25/60* (2013.01); *G10L 25/84* (2013.01); *G06N 5/003* (2013.01); *G06N 7/005* (2013.01); *G06N 20/10* (2019.01)

(58) Field of Classification Search
CPC ............................... G10L 17/00; G10L 17/26
See application file for complete search history.

(56) References Cited

U.S. PATENT DOCUMENTS 5,689,616 A * 11/1997 Li .................... G10L 15/005
  704/232
5,799,273 A * 8/1998 Mitchell ................ G06F 3/16
  704/235

(Continued)

OTHER PUBLICATIONS

Yukti Yatish "Cost for transcription services", [online], https://scribie.com, published on 2015. (Year: 2015).*

(Continued)

*Primary Examiner* — Jialong He
(74) *Attorney, Agent, or Firm* — Active Knowledge Ltd.

(57) ABSTRACT

A system and method for assessing transcription costs based on an audio file are provided. The method includes method for assessing an audio file for transcription includes accessing at least one audio file for transcription assessment; analyzing the at least one audio file to determine at least one transcription characteristic based on the at least one audio file; and calculating, based on the at least one determined transcription characteristic, an initial bid value for transcription of the audio file.

8 Claims, 3 Drawing Sheets

(51) Int. Cl.
  *G06N 5/00* (2006.01)
  *G06N 7/00* (2006.01)
  *G06N 20/10* (2019.01)

(56) References Cited

U.S. PATENT DOCUMENTS

| | | | |
|---|---|---|---|
| 8,219,397 B2 | 7/2012 | Jaiswal et al. | |
| 8,296,142 B2 | 10/2012 | Lloyd et al. | |
| 8,396,709 B2 | 3/2013 | Lloyd et al. | |
| 8,494,850 B2 | 7/2013 | Chelba et al. | |
| 8,527,276 B1 | 9/2013 | Senior | |
| 8,862,467 B1 | 10/2014 | Casado | |
| 8,886,535 B2 | 11/2014 | Chong et al. | |
| 9,146,248 B2 | 9/2015 | Hagerott et al. | |
| 9,251,809 B2 | 2/2016 | Reiner | |
| 9,311,915 B2 | 4/2016 | Weinstein et al. | |
| 9,401,142 B1* | 7/2016 | Rothwell | G06Q 30/02 |
| 9,412,365 B2 | 8/2016 | Biadsy et al. | |
| 9,591,268 B2 | 3/2017 | Stoops et al. | |
| 9,620,145 B2 | 4/2017 | Bacchiani et al. | |
| 2003/0200093 A1* | 10/2003 | Lewis | G06F 17/273 |
| | | | 704/260 |
| 2004/0162722 A1* | 8/2004 | Rex | G10L 25/48 |
| | | | 704/211 |
| 2007/0027686 A1* | 2/2007 | Schramm | G10L 13/00 |
| | | | 704/235 |
| 2007/0208567 A1* | 9/2007 | Amento | G10L 15/22 |
| | | | 704/270 |
| 2008/0255842 A1* | 10/2008 | Simhi | G10L 25/78 |
| | | | 704/246 |
| 2009/0187402 A1* | 7/2009 | Scholl | G10L 15/01 |
| | | | 704/233 |
| 2014/0288940 A1* | 9/2014 | Grant | G10L 19/167 |
| | | | 704/500 |
| 2014/0361973 A1 | 12/2014 | Raux et al. | |
| 2015/0039306 A1* | 2/2015 | Sidi | G10L 15/01 |
| | | | 704/235 |
| 2015/0081288 A1 | 3/2015 | Kim | |
| 2015/0199966 A1* | 7/2015 | Paulik | G10L 15/26 |
| | | | 704/235 |
| 2015/0243285 A1 | 8/2015 | Lane et al. | |
| 2017/0061966 A1 | 3/2017 | Marcheret et al. | |
| 2018/0047387 A1* | 2/2018 | Nir | G10L 15/02 |

OTHER PUBLICATIONS

TranscribeMe, "Highest quality consumer and enterprise transcription services", [online], http://transcribeme.com, retrieved from archive.org, archiving date: 2016 (Year: 2016).*

McLoughlin et al. "Robust Sound Event Classification Using Deep Neural Networks", IEEE/ACM Transactions on Audio, Speech, and Language Processing, vol. 23, No. 3, Mar. 2015 (Year: 2015).*

Liu, Minghui, et al. "A new hybrid GMM/SVM for speaker verification." 18th International Conference on Pattern Recognition (ICPR'06). vol. 4. IEEE, 2006. (Year: 2006).*

You, Chang Huai, Kong Aik Lee, and Haizhou Li. "GMM-SVM kernel with a Bhattacharyya-based distance for speaker recognition." IEEE Transactions on Audio, Speech, and Language Processing 18.6 (2009): 1300-1312. (Year: 2009).*

* cited by examiner

SYSTEM AND METHOD FOR ASSESSING AUDIO FILES FOR TRANSCRIPTION SERVICES

CROSS-REFERENCE TO RELATED APPLICATIONS

This application claims the benefit of U.S. Provisional Application No. 62/509,853 filed on May 23, 2017, the contents of which are hereby incorporated by reference.

TECHNICAL FIELD

The present disclosure relates generally to audio transcription systems, and more specifically a system and method for assessing audio files for determining an initial bid for audio transcriptions.

BACKGROUND

Transcription in the linguistic sense is a systematic representation of language in written form. The source of a transcription can either be utterances (e.g., speech or sign language) or preexisting text in another writing system.

In the academic discipline of linguistics, transcription is an essential part of the methodologies of phonetics, conversation analysis, dialectology and sociolinguistics. It also plays an important role for several subfields of speech technology. Common examples for transcription use employed outside of academia involve the proceedings of a court hearing, such as a criminal trial (by a court reporter), a physician's recorded voice notes (medical transcription), aid for hearing impairment personas, and the like.

Recently, transcription services have become commonly available to interested users via various online web sources. Examples for such web sources include rev.com, transcribeMe®, and similar services where audio files are uploaded and distributed via a marketplace to a plurality of individuals who are either freelancers or employed by the web source operator to transcribe the audio file. However, it can be difficult to properly analyze an audio file in an automated fashion. These audio files are heterogeneous by nature in regards a speaker's type, accent, background noise within the file, context, and subject matter of the audio. Thus, assessing the file contents and determining the cost and effort required for proper transcription often involves human involvement, which can be time consuming, inefficient and costly. Therefore, the task of optimally assessing an audio file for transcription purposes in a more efficient manner is desired.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a system and method for assessing an audio file for transcription, including: accessing at least one audio file for transcription assessment; analyzing the at least one audio file to determine at least one transcription characteristic based on the at least one audio file; and calculating, based on the at least one determined transcription characteristic, an initial bid value for transcription of the audio file.

Certain embodiments disclosed herein also include a non-transitory computer readable medium having stored thereon instructions for causing a processing circuitry to perform a process, the process including: accessing at least one audio file for transcription assessment; analyzing the at least one audio file to determine at least one transcription characteristic based on the at least one audio file; and calculating, based on the at least one determined transcription characteristic, an initial bid value for transcription of the audio file.

Certain embodiments disclosed herein also include a system for assessing an audio file for transcription, including: a processing circuitry; and a memory, the memory containing instructions that, when executed by the processing circuitry, configure the system to: access at least one audio file for transcription assessment; analyze the at least one audio file to determine at least one transcription characteristic based on the at least one audio file; and calculate, based on the at least one determined transcription characteristic, an initial bid value for transcription of the audio file.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
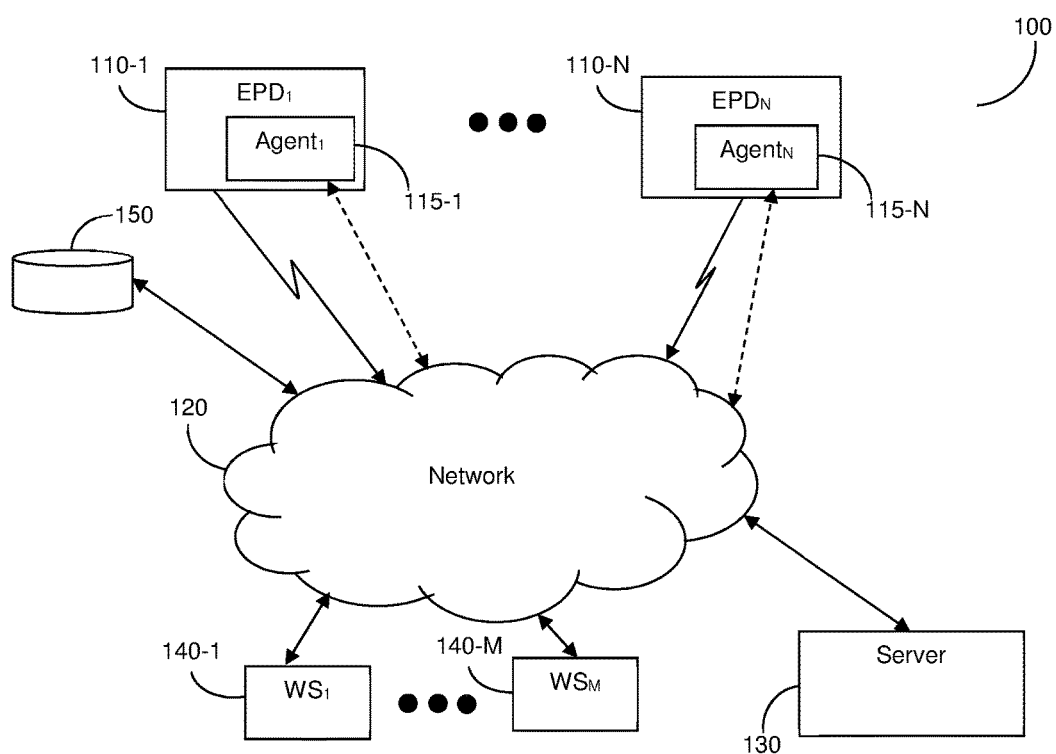
FIG. 1 is a diagram of a system for assessment of audio files for transcriptions according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a system and a method for assessing optimal transcription costs related to a particular audio file. In an embodiment, an audio file is received by a system and analyzed using one or more speech recognition techniques. Based on the analysis, metadata related to the audio file is generated. The metadata includes one or more transcription characteristics such as, for example, signal to noise ratio (SNR), accents present within the file, number of active speakers, background noises, and the like. Based on the generated metadata, the system is further configured to generate a cost assessment for a transcription of the audio file.

It should be noted that based on the generated metadata, certain audio files can be directed toward certain services. As a non-limiting example, upon identifying an audio file as containing confidential information, the pool of eligible candidates for providing the transcription services can be limited to include only those who have been identified as having passed a confidentiality clearance sufficient for the relevant audio file. Thereafter, a cost is determined and presented to an entity (i.e., an individual directly or a company providing such services) as an offer for the completion of the transcription services.

FIG. 1 shows an example diagram of a system 100 for assessment of audio files for transcriptions according to an embodiment. The system 100 may include the implementation of a marketplace for the transcription of audio files based on the assessment. The assessment includes the determination of an initial cost based on the particular audio file.

A plurality of end point devices (EPD) 110-1 through 110-N (collectively referred hereinafter as end point devices 110 or individually as an end point device 110, merely for simplicity purposes), where N is an integer equal to or greater than 1, are communicatively connected to a network 120. The EPDs 110 can be, but are not limited to, smart phones, mobile phones, laptops, tablet computers, wearable computing devices, personal computers (PCs), a combination thereof and the like. The EPDs 110 may be operated by entities looking for transcription services for audio files and/or providing transcription such services, e.g., transcription employees or freelancers.

According to an embodiment, each of the EPDs 110-1 through 110-N has an agent installed therein 115-1 through 115-N, respectively. Each of the agents 115 may be implemented as an application program having instructions that may reside in a memory of the respective EPD 110.

The network 120 may include a bus, a local area network (LAN), a wide area network (WAN), a metro area network (MAN), the worldwide web (WWW), the Internet, as well as a variety of other communication networks, whether wired or wireless, and any combination thereof, that are configured to enable the transfer of data between the different elements of the system 100.

A server 130 is further connected to the network 120. The server 130 is configured to receive audio files for transcription assessment from one or more EPDs 110. The server 130 typically includes a processing unit such as a processor and a memory (not shown). The memory contains therein instructions that, when executed by the processing unit, configures the server 130 to assess an audio file as further described herein.

According to an embodiment, the requests for assessment of associated audio files may be received by the server 130 via one or more web sources 140-1 to 140-M communicatively connected to the server 130 via the network 120. According to an embodiment, the web source 140 may be a web based marketplace for transcription services operated by the server 130. According to another embodiment, the web source 140 may be configured to receive and send data from one or more EPDs 110 via the network 120.

The system 100 further includes a database 150. The database is configured to store therein information (e.g., metadata) associated with the previous audio file assessments generated by the server 130. The database 150 may be connected to the network 150, or connected directly to the server 130 (not shown). The server 130 is configured to access the database 150 in order to compare metadata from a previously analyzed audio file to an audio file currently being analyzed.

According to the embodiments disclosed herein, the server 130 is configured to generate an assessment of the costs for transcription of a certain audio file based on transcription characterizes determined by analyzing the audio file. The assessment may further include an estimate of the amount of time needed for a transcription based on the characterizes of the audio file, including the length of audio file, the complexity of subject matter of the audio file, and the like.

The server 130 is configured to receive a request to assess the cost of transcription of at least one audio file over the network 120. The request is received from an EPD 110 via, for example, the web source 140 over the network 120 and includes the at least one audio file. The request may further include one or more associated requests and details related to the desired transcription, for example, a desired time frame of completion, quality requirements for the resulting transcription, confidentiality level of the contents, language of the audio, and the like. In an embodiment, the request includes receipt of the at least one audio file.

Thereafter, the at least one audio file is analyzed by the server 130. The analysis may include one or more deep learning techniques and/or one or more speech recognition techniques. According to an embodiment, the analysis may at least be partially based on one or more neural networks extracted from the database 150—for example, a system for audio characterization that trains bottleneck features from neural networks, e.g., linear and non-linear audio processing algorithms that may be implemented using neural networks for audio processing. The algorithms may include, for example, decision tree learning, clustering, homomorphic filtering, wideband reducing filtering, and sound wave anti-aliasing algorithms.

Based on the analysis, the server 130 is configured to generate one or more transcription characteristics. The transcription characteristics may include, for example, signal to noise ratio, clarity of recording, accents and other speech features, number of speakers captured within the audio file, background noises, a combination thereof, portions thereof, and the like. According to an embodiment, the process of generating the transcription characteristics comprises identification of all type of noises in the record, e.g., main speaker(s), other speaker(s), background noises, white noises, etc. A signature is then generated for each characteristic. Then, volume and clarity for each characteristic are determined based on a match between the generated characteristics.

According to a further embodiment, the transcription characteristics may further include contextual variables associated with the audio file. The contextual variables may include, for example, a topic of the audio file, a source of the audio file, lingual indicators, and the like. A weighted decision algorithm may be used for calculating a value for each transcription characteristic.

Based on the generated transcription characteristics, the server 130 is configured to generate an assessment of the audio file. The assessment is an aggregated numeric value of an initial bid for the transcription of the audio file. The assessment may further be made by querying the database 150 to compare the audio file to similar audio files having at least partially matching transcription characteristics.

The initial bid value may then be published to the web based marketplace by the server 130. According to another embodiment, the bid may be provided directly to an EPD 110 associated with the request. According to yet another embodiment, the bid may be used in querying for candidates interested in providing transcription services. For example, the server 130 may have a list of transcription candidates willing to provide services based on the matching of specific skillsets with the determined transcription characteristics. If the analyzed audio file matches with these skills, e.g., a particular language or technical skillset, those candidates can be targeted by the server 130.

It should be noted that the generation of the assessment is an inherit requirement for establishing the marketplace, as it enables the online, contextual negotiation between an entity requesting the transcription and an entity interested in providing the transcription services.

Figure 2:
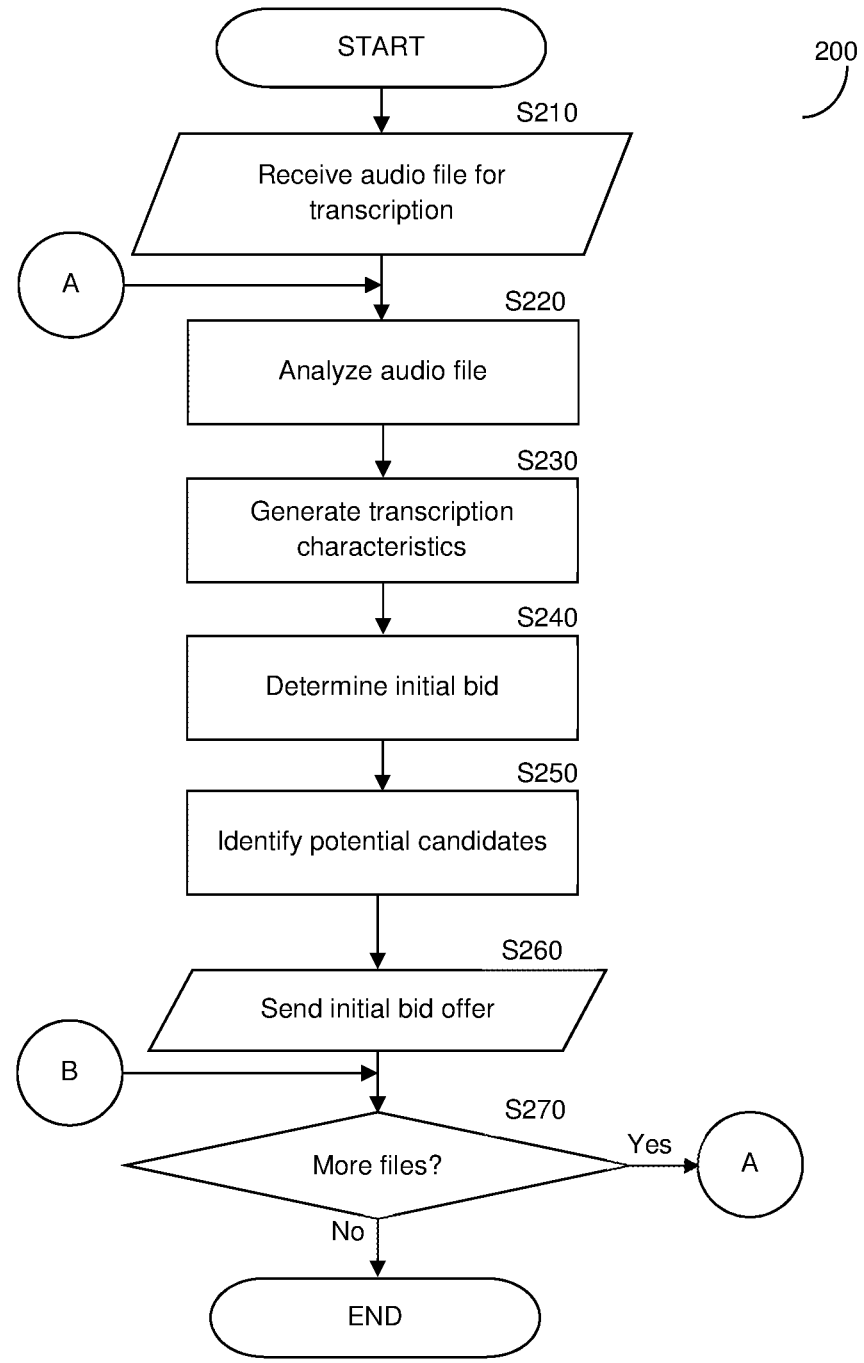
FIG. 2 is a flowchart of a method for assessing audio files for transcription according to an embodiment.

FIG. 2 depicts an example flowchart 200 describing the operation of a method for providing an assessment of an audio file for transcription according to an embodiment. At S210, a request to assess at least one audio file for transcription is received, e.g., by the server 130 via the network 120 of FIG. 1. The request may be received via a web source 140 or directly from an EPD 110. In an embodiment, the request is initiated by the receipt of the at least one audio file.

At S220, the audio file is analyzed using various processing methods. In an embodiment, the analysis includes evaluating the audio file to detect known patterns and features in order to determine transcription characteristics. The evaluation is made by identifying and classifying all the sounds in the audio file, e.g., background noises, main speaker(s), other speaker(s), etc. In an embodiment, the evaluation is performed using a neural network structure to assess the features of the audio file.

At S230, based on the analysis, one or more transcription characteristics are generated. The generation of the transcription characteristics includes determining various audio fingerprints of the audio within the audio file, such as signal to noise ratio, clarity of recording, accents and other speech features, number of speakers captured within the audio file, background noises, a combination thereof, portions thereof, and the like. Additionally, contextual variables may be determined to provide further information regarding the audio file, wherein the context variables may include a topic of the audio file, source of the audio file, lingual indicators, and the like. The generation of the transcription characteristics is further described herein below with respect of FIG. 3.

At S240, based on the one or more transcription characteristics, which may include the contextual variables, an initial bid value is determined. The initial bid value is a determined optimal initial price for the transcription service to be used in a marketplace, e.g., the web marketplace discusses herein. In an embodiment, a database containing a set of rules or a set of predetermined optimal prices associated with various transcription characteristics may be accessed, wherein the audio file features are compared to the set of rules relating to similar characteristics or to previously analyzed audio files stored within the database. In an embodiment, the initial bid value may further consider variables that are not directly related to the audio file, such as time of the intended introduction of the bid to a marketplace, the current demand for transcriptions, current availability of transcription services, and the like.

At optional S250, one or more potential candidates for providing the transcription services are identified by the server 130. A list of candidates with relevant skillsets may be accessed via the network, e.g., through a web source 140. At optional S260, an offer to perform the transcription services based on the audio file is provided to the one or more potential candidates, where the offer includes the initial bid value.

In an embodiment, the offer is displayed or made readily available on a marketplace. The offer may be targeted to a subset of the potential candidates, to the entire set of potential candidates, or to anyone granted access to the marketplace. Interested candidates may further bid on the transcription service. In one embodiment, the marketplace is configured as a first-come-first-system, i.e., the first candidate to accept the initial bid value may be awarded the transcription service, while in further embodiments multiple potential candidates may present counteroffers through the marketplace. Counteroffers may include adjusted timeframes of completion, adjusted prices for the services, and the like. A user initiating the bid may then accept or reject the counteroffers.

At S270, it is determined whether additional requests for transcription services have been received, e.g., if multiple audio files have been received by the server, and if so, execution continues with S220; otherwise, execution terminates.

Figure 3:
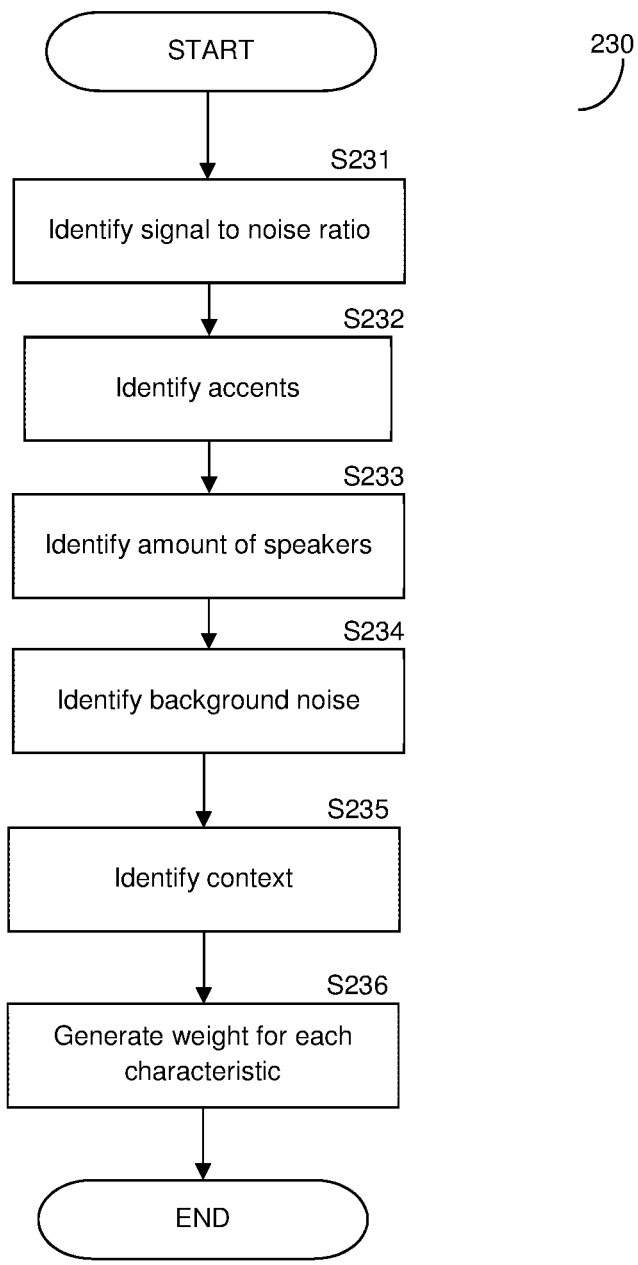
FIG. 3 is a flowchart of a method for the identification of transcription characteristics of an audio file according to an embodiment.

FIG. 3 depicts an example flowchart 300 describing the operation of a method for generating transcription characteristics based on an audio file received according to an embodiment. In S231, when a signal to noise ratio of the audio within the audio file is determined.

Signal-to-noise ratio (SNR) is a measure that compares a level of a desired signal to a level of background noise. It is defined as the ratio of signal power to the noise power, and may be expressed in decibels. The desired signal, e.g., the most prominent voice detected within an audio file, may be identified in real time by comparing the value of the signal power to the noise power. For example, the SNR may be defined as equal to the acoustic intensity of the signal divided by the acoustic intensity of noise. Alternatively, the SNR may be calculated by determining a section of the audio file that contains the desired signal and noise to a section of the audio file that only contains noise. The SNR may be determined by dividing the amplitude of former by the amplitude if the latter.

At S232, accents are identified within the audio file, i.e., accents for each speaker based on an associated signature. Example for such accent identification may include phonological GMM-SVM, GMM-UBM, iVectors, and the like.

At S233, the number of speakers in the audio file is identified. The identification may be achieved by generating a signature to each voice determined to be unique within the audio file. At S234, background noise in the audio file is identified. Background noise can include, e.g., white noise present throughout an entire recording, distinct sounds determined to be unwanted (e.g., a doorbell or a phone ringtone), artificial audio artifacts present within the audio file, and the like.

At optional S235, contextual variables associated with the audio files are identified, wherein the contextual variables include, but are not limited to, a topic of the audio file, source of the audio file, lingual indicators, and the like.

At S236, a weighted value is associated with the identified characteristics, wherein the weighted value attributes more significance to certain variables than others. For example, if the number of speakers within an audio file is determined to be more than one, the initial bid value determined according to the method described in FIG. 2 may be raised more than if the background noise identified within the audio file is above a predetermined threshold. In other words, the method can be configured to attribute more value to certain characteristics when determining the initial bid than to others.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for assessing an audio file for transcription, comprising:
    generating signatures of voices determined to be unique within the audio file;
    determining number of speakers captured within the audio file based on the signatures;
    determining accent of each speaker from the speakers utilizing at least one of support vector machines using Gaussian mixture models (GMM-SVM), Gaussian mixture model with universal background model (GMM-UBM), and iVectors for speech processing applications;
    identifying a main speaker and another speaker within the audio file;
    identifying characteristics of noise in a recording of the main speaker, and characteristics of noise in a recording of the other speaker;
    calculating a bid value for transcription of the audio file based on the number of speakers, the accent of each speaker, the characteristics of noise in the recording of the main speaker, and the characteristics of noise in the recording of the other speaker; and
    identifying transcription candidates by a server to provide services based on matching of specific skillsets with the accent of each speaker.

2. The method of claim 1, wherein the bid value depends on time of introducing the transcription of the audio file to a marketplace.

3. The method of claim 1, wherein the bid value depends on current demand for transcriptions when introducing the transcription of the audio file to a marketplace.

4. The method of claim 1, wherein the bid value depends on current availability of transcription services when introducing the transcription of the audio file to a marketplace.

5. A system for assessing an audio file for transcription, comprising:
    a processing circuitry; and
    a memory, the memory containing instructions that, when executed by the processing circuitry, configure the system to:
    generate signatures of voices determined to be unique within the audio file;
    determine number of speakers captured within the audio file based on the signatures;
    determine accent of each speaker from the speakers utilizing at least one of support vector machines using Gaussian mixture models (GMM-SVM), Gaussian mixture model with universal background model (GMM-UBM), and iVectors for speech processing applications;
    identify a main speaker and another speaker within the audio file;
    identify characteristics of noise in a recording of the main speaker, and characteristics of noise in a recording of the other speaker;
    calculate a bid value for transcription of the audio file based on the number of speakers, the accent of each speaker, the characteristics of noise in the recording of the main speaker, and the characteristics of noise in the recording of the other speaker; and
    identify transcription candidates by a server to provide services based on matching of specific skillsets with the accent of each speaker.

6. The system of claim 5, wherein the bid value depends on time of introducing the transcription of the audio file to a marketplace.

7. The system of claim 5, wherein the bid value depends on current demand for transcriptions when introducing the transcription of the audio file to a marketplace.

8. The system of claim 5, wherein the bid value depends on current availability of transcription services when introducing the transcription of the audio file to a marketplace.

* * * * *